C. F. SMITH.
TRACTOR.
APPLICATION FILED APR. 10, 1916.

1,194,085.

Patented Aug. 8, 1916.

WITNESSES:

INVENTOR
CHRIS F. SMITH,
BY
ATTORNEYS

UNITED STATES PATENT OFFICE.

CHRIS F. SMITH, OF SCOTTSBLUFF, NEBRASKA.

TRACTOR.

1,194,085.     Specification of Letters Patent.     Patented Aug. 8, 1916.

Application filed April 10, 1916. Serial No. 90,239.

*To all whom it may concern:*

Be it known that I, CHRIS F. SMITH, a citizen of the United States, and a resident of Scottsbluff, in the county of Scotts Bluff and State of Nebraska, have invented a new and useful Improvement in Tractors, of which the following is a specification.

My invention is an improvement in tractors, and has for its object to provide a tractor consisting of similar independent units, each having its own power plant, and wherein mechanism is provided for connecting the units to permit them to operate together.

Figure 1:
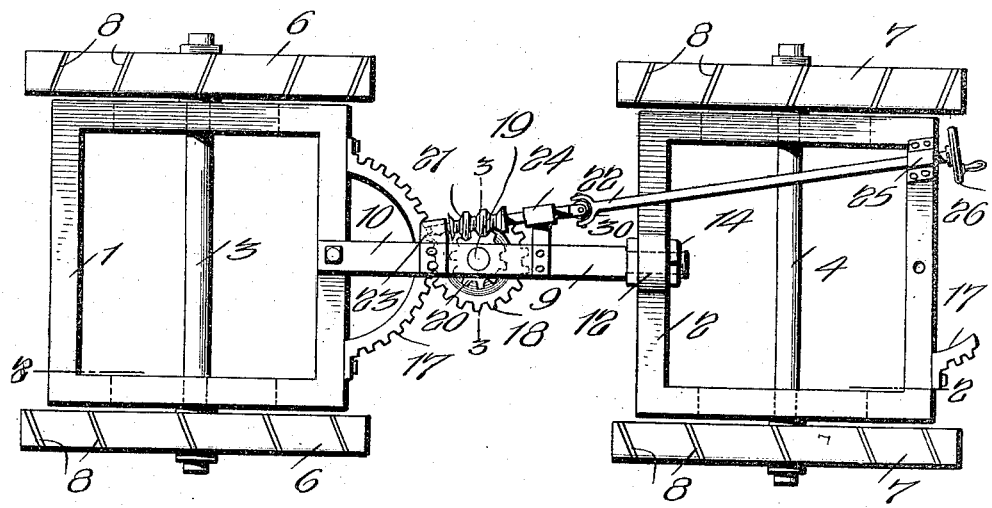
Figure 1:
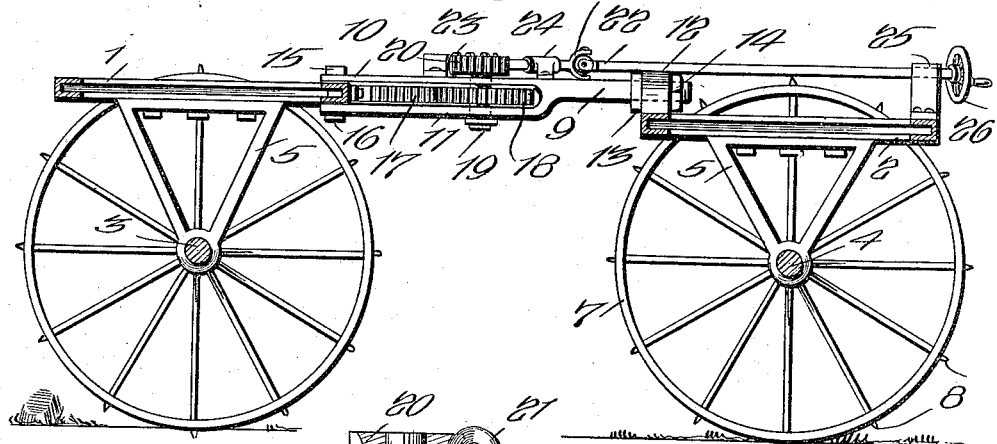

In the drawings:—Figure 1 is a top plan view of the improved tractor, and Figs. 2 and 3 are sections on the lines 2—2 and 3—3, respectively, of Fig. 1.

In the present embodiment of the invention a plurality of frames is provided, each in the present instance, being square and of channel material with the channel facing inward, and the frames 1 and 2 are connected to axles 3 and 4, by means of bolster brackets 5 of ordinary construction for spacing the frames above the axles. Each axle is provided with the usual wheels 6 and 7, respectively, and each wheel is provided on its periphery with clips 8, the clips being inclined in the present instance. The power plant of each unit is supported on the frame and is connected to the wheels in any usual or desired manner, and the two units may be connected by means of a yoke or bracket, comprising a body portion 9 and upper and lower arms 10 and 11.

The frame 2 is provided with a bearing 12 on that side adjacent to the other unit, and at the center, and the end of the body which is threaded is passed through the bearing. A stop 13 is provided on the body at the outer end of the bearing and a nut 14 is threaded on to the body on the inner side of the frame. The arms 10 and 11 lap over the adjacent side of the frame of the other unit and a bolt 15 is passed through registering openings in the arms and in the frame, and is engaged by a nut 16 to hold the parts in place. Thus the bracket is rigidly but detachably connected with one unit, namely, to the unit 2, and pivotally and detachably with the unit 1.

A toothed sector 17 is secured to the side of the frame to which the arms are pivoted, the sector extending between the arms, and the teeth of this sector are engaged by a pinion 18 on a stub shaft 19, which is journaled in the arms 10 and 11. The shaft extends above the arm 10 and a worm wheel 20 is secured to the extended end. This wheel is engaged by a worm 21 on a steering shaft 22, which is journaled in bearings 23, 24 and 25, on the arm 10, the yoke body and the frame 2, respectively. The shaft is provided with a hand wheel 26 at its outer end, and it will be evident that by turning the wheel the unit 1—3—5—6 may be swung with respect to the unit 2—4—5—7 to guide the tractors.

In practice the units will be provided with power plants of different capacities as for instance, the unit 1—3 might have a six horse power plant, while the unit 2—4 might have a twelve horse power plant. When coupled the tractor would have a capacity of eighteen horse power and either unit might be used independently of the other.

It will be noticed that a universal joint is arranged in the steering column adjacent to the bearing 24 for preventing injury to the collar when a wheel passes over an obstruction. The rear unit of the tractor is provided with a toothed sector 17 in the same manner as the front unit, and the coupling bar may be connected to the rear unit in the same manner as to the front unit. Thus the units may be coupled up as many in number as may be necessary.

I claim:—

A tractor, comprising units, each consisting of a frame, an axle journaled below the frame, bolster brackets rigid with the frame and in which the axle is journaled, a rigid coupling bar for connecting adjacent units, said bar having a rigid connection with one unit and being forked, and the arms of the fork engaging above and below the frame of the other unit and being pivoted thereto, a toothed sector secured to the last named unit between the arms, a pinion journaled between the arms and engaging the sector, and means for turning the pinion.

CHRIS F. SMITH.

Copies of this patent may be obtained for five cents each, by addressing the "Commissioner of Patents, Washington, D. C."